Patented Mar. 27, 1923.

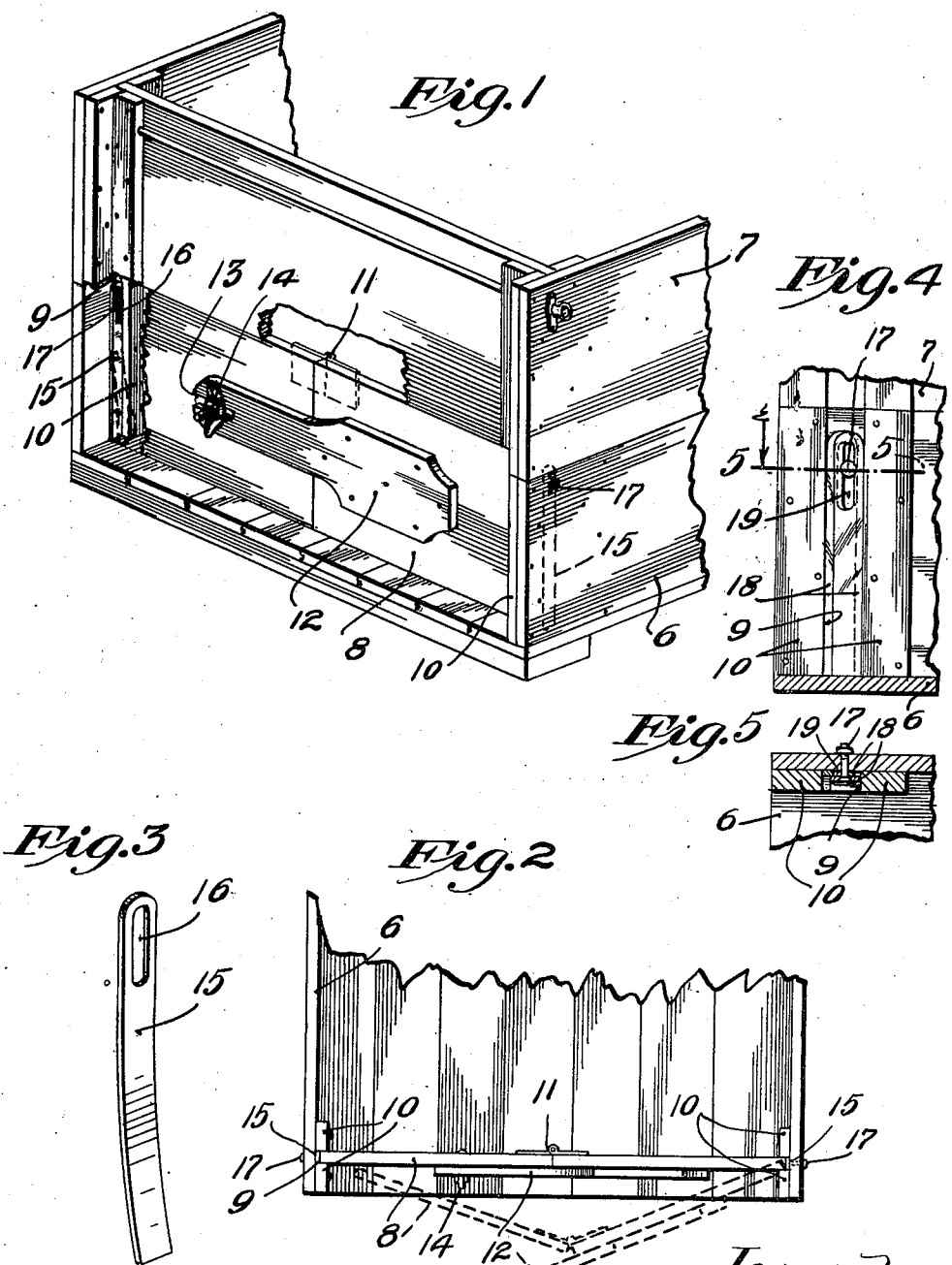

1,449,653

UNITED STATES PATENT OFFICE.

FRANKLIN T. CARLSON, OF STRATFORD, IOWA.

CLEANING DEVICE FOR GATE SEATS AND THE LIKE.

Application filed March 20, 1922. Serial No. 544,989.

*To all whom it may concern:*

Be it known that I, FRANKLIN T. CARLSON, a citizen of the United States, residing at Stratford, in the county of Hamilton and State of Iowa, have invented certain new and useful Improvements in Cleaning Devices for Gate Seats and the like; and I do hereby declare the following to be a full, clear, and exact description of the invention, such as will enable others skilled in the art to which it appertains to make and use the same.

My invention relates to bodies or boxes having discharge openings and channel seats or guides for gates or closures normally closing said openings, and more particularly, the invention relates to vehicle bodies or boxes for carrying grain or other materials in bulk and having gate-controlled openings through which such materials may be discharged.

The invention has for its object to provide cleaning devices for such seats or guides to exclude therefrom grain or other materials that might lodge therein and interfere with the closing of the gates. The invention is especially well adapted for use in connection with the channel seats or guides for the gates of farm wagon boxes or trucks.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary rear end elevation of a farm wagon box having the invention applied thereto;

Fig. 2 is a plan view of the parts shown in Fig. 1, with the exception that the top section of the box, has been removed and the end gate is indicated in another position by means of broken lines;

Fig. 3 is a perspective of one of the cleaning springs;

Fig. 4 is a view partly in side elevation and partly in vertical section illustrating a slight modification of the cleaning device; and Fig. 5 is a view principally in horizontal section taken on the line 5—5 of Fig. 4.

The numeral 6 indicates a standard farm wagon box having a displaceable box section 7 and an end gate 8 removably held in channel seats 9 formed between pairs of laterally spaced upright cleats 10 secured to the inner faces of the sides of said wagon box. The end gate 8 is of the transversely divided type, the sections of which are connected by hinges 11 for outward folding or buckling movement to release said sections from the seats 9. The sections of the end gate 8 are held aligned or in operative positions in the seats 9 by a bar 12 rigidly secured to one of the end gate sections and extending transversely across the joint between the gate sections. The other or free end of the bar 12 is releasably secured to the other section of the end gate 8 by forming therein a longitudinal notch 13 adapted to receive a nut-equipped bolt 14 in said section. The parts thus far described are of standard and well known construction.

Referring now in detail to the invention as illustrated in Figs. 1 to 3, inclusive, the cleaning devices are in the form of upright flat springs 15 mounted in the seats 9. The upper ends of the springs 15 are slotted at 16 to receive nut-equipped bolts 17 for securing said springs in the bottoms of the seats 9 with freedom for vertical or endwise adjustment. The width of the springs 15 is such as to extend completely across the channel seats 9 with just enough clearance to work therebetween without binding.

The lower end portions of the cleaning springs 15 are curved or bent toward each other and are under strain to move substantially into the planes of the outer faces of the cleats 10. Normally, when the end gate 8 is secured in the seats 9, the springs 15 are held compressed thereby on the bottoms of the seats 9. When the end gate 8 is removed from the box 6, the springs 15 follow up the adjacent ends of the sections of the end gate as they move out of the seats 9 and carry with them any grain, dirt or other material which may work in between the end gate and the seats 9. As the cleaning springs 15 close the lower end portions of the seats 9, when the end gate is removed therefrom, grains, dirt or other materials are prevented from accumulating in the seats 9 during the discharge of such materials upon the wagon box 6 and which would interfere with the replacing of the end gate 8 in the seats 9.

Referring now to the modifications shown in Figs. 4 and 5, two springs 18 are mounted in each seat 9 and are longitudinally overlapped so that they may be adjusted to seats of different widths. These springs 18 have, in their upper ends, slots 19 through which the nut-equipped bolts 17 extend to connect the pair of springs 18 to the wagon box 6. It is important to note that the slots 19 in the underlying springs 18 are materially wider than the slots in the uppermost springs to permit offsetting of the springs of each pair in overlapped relation.

The above described invention has, in actual usage, proved highly efficient for the purpose had in view and can be very quickly applied to a wagon box of standard construction.

What I claim is:

1. The combination with a box having a discharge opening and a channel seat, of a gate for said opening mounted in the channel seat, and a yielding cleaning device for the channel seat and arranged to follow the gate during its movement out of the channel seat.

2. The structure defined in claim 1 in which the cleaning device is held retracted by the gate.

3. The structure defined in claim 2 in which the cleaning device is transversely adjustable to fit channel seats of different widths.

4. The combination with a box having a discharge opening and a vertical channel seat the lower end of which is closed, of a gate for the discharge opening mounted in the channel seat, and a flat cleaning spring mounted in the channel seat, the lower end of the cleaning spring being free to move closely over the closed lower end of the channel seat and normally held retracted by the gate.

5. The combination with a box having a discharge opening and a vertical channel seat the lower end of which is closed, of a gate for the discharge opening mounted in the channel seat, and a flat cleaning spring having its upper end secured in the bottom of the channel seat, the lower end of the cleaning spring being free to move closely over the closed lower end of the channel seat and normally held retracted by the gate.

6. The structure defined in claim 5 in which the cleaning spring is vertically adjustable in the channel seat.

7. The combination with a box having a discharge opening and a vertical channel seat the lower end of which is closed, of a gate for the discharge opening mounted in the channel seat, and a pair of overlapped flat cleaning springs the upper ends of which are secured in the bottom of the channel seat, the lower ends of the cleaning springs being free to move closely over the closed lower end of the channel seat and normally held retracted by the gate.

8. The structure defined in claim 7 in which the springs are vertically adjustable in the channel seat.

9. The structure defined in claim 7 in which the cleaning springs are edgewise adjustable in respect to each other.

In testimony whereof I affix my signature.

FRANKLIN T. CARLSON.